J. McMAHON.
NUT SPLITTER.
APPLICATION FILED AUG. 6, 1917.
1,285,292.
Patented Nov. 19, 1918
2 SHEETS—SHEET 1.
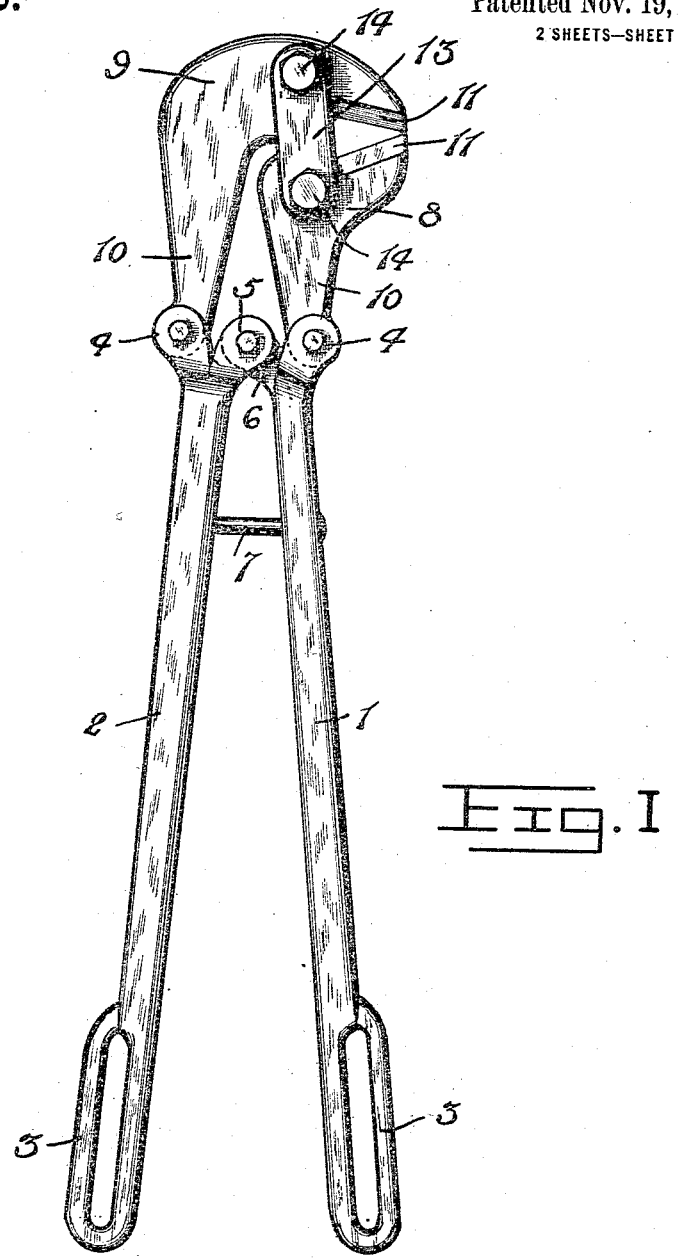
Fig. I
Inventor:
James McMahon J. McMAHON.
NUT SPLITTER.
APPLICATION FILED AUG. 6, 1917.
1,285,292.
Patented Nov. 19, 1918.
2 SHEETS—SHEET 2.
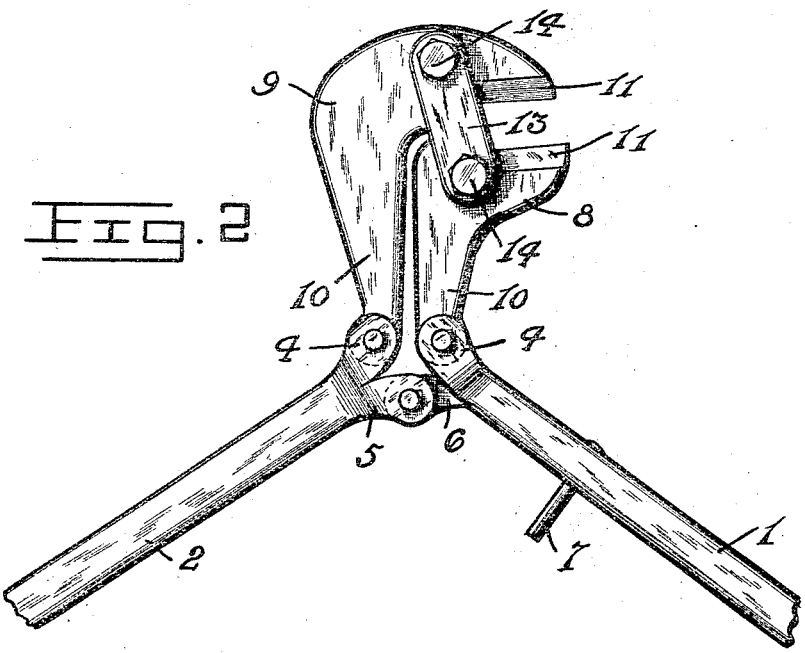
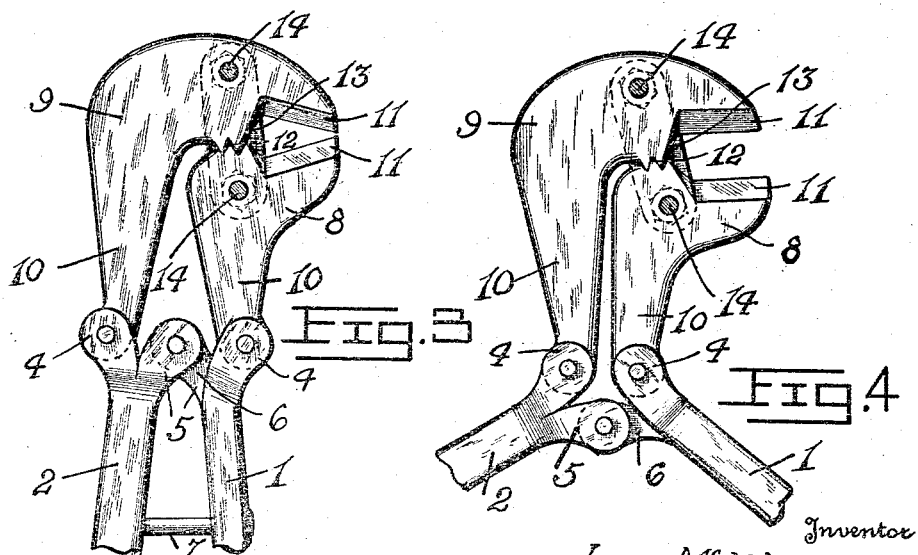
Inventor:
James McMahon
By *(signature)*
Attorneys

UNITED STATES PATENT OFFICE.

JAMES McMAHON, OF ENDERBY, BRITISH COLUMBIA, CANADA.

NUT-SPLITTER.

1,285,292.  Specification of Letters Patent.  Patented Nov. 19, 1918.

Application filed August 6, 1917. Serial No. 184,592.

*To all whom it may concern:*

Be it known that I, JAMES MCMAHON, a subject of the King of Great Britain, residing at Enderby, Province of British Columbia, Canada, have invented certain new and useful Improvements in Nut-Splitters; and I do hereby declare that the following is a full, clear, and exact description of the invention, such as will enable others skilled in the art to which it appertains to make and use the same.

The present invention relates to nut splitters and has for its object to provide a tool designed for splitting nuts which are impossible to otherwise remove from bolts. Nuts upon buggy wheels and the like which have become impossible to remove by an ordinary wrench, the present invention will facilitate in the removing of these nuts by splitting the same whereby they can be easily taken off.

With the above and other objects in view which will hereinafter appear as the description continues, the invention consists of the novel features of construction, combination and formation of parts as will be hereinafter more fully described and particularly pointed out in the appended claim.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawing:

Figure 1 is a side elevation of the complete tool embodying the present invention when the jaws thereof are closed;

Fig. 2 is a side elevation showing the position of the jaws when open;

Fig. 3 is a side elevation when the jaws are closed when having one of the connecting links removed to better illustrate the connection between the jaws; and, Fig. 4 is a similar view when the jaws have been opened.

Referring now more particularly to the accompanying drawings wherein like and corresponding parts are designated by similar reference characters throughout the several views, The numerals 1 and 2 indicate two relatively long arms each having a handle 3 formed at one end thereof. The opposite ends of these arms 1 and 2 are provided with the bifurcated lug projections 4. Also formed with the upper end of the arm 2 is a bifurcated lug projection 5 in which rests the lug projection 6 formed with the arm 1 and these lugs 5 and 6 are pivotally connected together. Projecting from the arm 1 is a stop pin 7 whereby the movement of the arms relative to each other will be limited for a purpose which will be later set forth.

Pivotally connected to the lug projections 4 are a pair of angular jaws 8 and 9 each of which has a long arm 10 which arms are pivotally connected to the lugs 4. The shorter arms of the jaws are provided with the cutting edges 11. These jaws are provided with the teeth 12 which are adapted to mesh together so as to form a fulcrum for the jaws. To keep these teeth in mesh with each other the links 13 are provided which are pivotally connected by means of the bolts 14 to the respective jaws.

From the foregoing it is obvious that upon swinging the arms 1 and 2 upon their pivoted connections, the jaws 8 and 9 will also be caused to move and due to the connections between the jaws and the arms 1 and 2 a greater leverage is obtained whereby manual power may be used for splitting the nuts between the blades 11.

The stop pin 7 limits the swinging movement of the arms 1 and 2 toward each other to prevent the cutting edges 11 from coming in contact with each other which would obviously dull the same.

Having thus fully described my invention, what I claim as new and desire to secure by Letters Patent is:

In a nut splitter comprising a pair of relatively long arms having their outer ends pivotally connected together, a pair of jaw arms, one of each of said jaw arms being connected to the outer ends of said pivotally connected arms, cutting edges formed with said jaw arms at right angles thereto, teeth formed with said jaws, and links connecting said angular cutting edges together whereby the teeth of said jaws will be in mesh substantially as and for the purpose specified.

In witness whereof I have hereunto set my hand.

JAMES McMAHON.

Witnesses:
C. H. REEVES,
ARTHUR CLIFTON SKALING.